Figure 1:
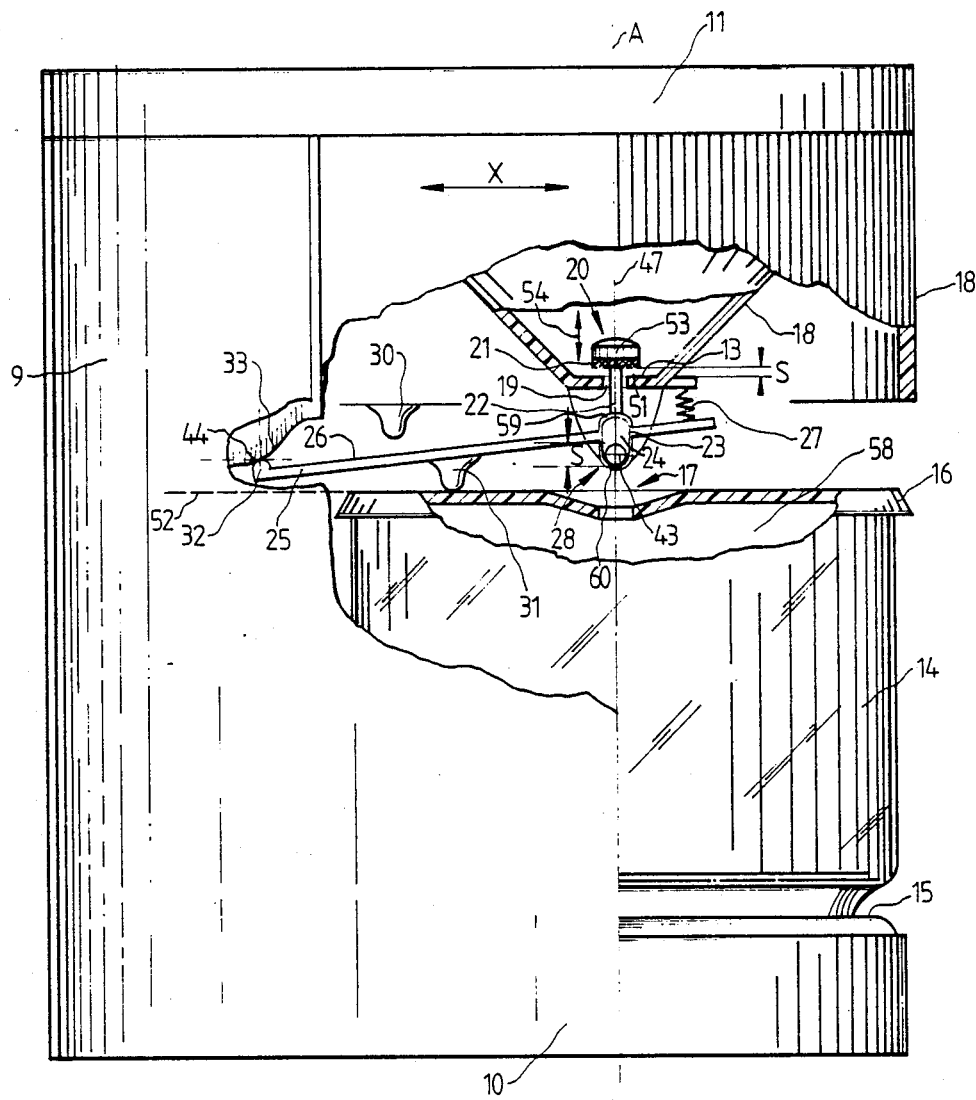

United States Patent [19]

Wunder et al.

[11] Patent Number: 4,893,552
[45] Date of Patent: Jan. 16, 1990

[54] BEVERAGE-MAKING MACHINE

[75] Inventors: Dieter Wunder, Reichelsheim; Hans-Jürgen Henning, Königstein, both of Fed. Rep. of Germany

[73] Assignee: Braun Aktiengesellschaft, Kronberg, Fed. Rep. of Germany

[21] Appl. No.: 279,436

[22] Filed: Dec. 2, 1988

[30] Foreign Application Priority Data

Dec. 18, 1987 [DE] Fed. Rep. of Germany ....... 3743050

[51] Int. Cl.$^4$ .............................................. A47J 31/24
[52] U.S. Cl. ........................................ 99/299; 99/295
[58] Field of Search ................. 99/299, 295, 306, 280, 99/300, 304, 305, 279; 141/335, 351; 426/433

[56] References Cited

U.S. PATENT DOCUMENTS

| | | | |
|---|---|---|---|
| 2,951,431 | 9/1960 | Hugentobler | 99/299 |
| 3,034,418 | 5/1962 | Bunn | 99/323 |
| 3,187,663 | 6/1965 | McLean | 99/306 |
| 4,343,232 | 8/1982 | Corbier | 99/299 |
| 4,467,707 | 8/1984 | Amiot | 99/295 |
| 4,506,597 | 3/1985 | Karns | 99/295 |
| 4,667,587 | 5/1987 | Wunder . | |

Primary Examiner—Robert W. Jenkins
Attorney, Agent, or Firm—Fish & Richardson

[57] ABSTRACT

A beverage making machine includes a housing with structure defining a storing receptacle receiving region and support structure above the storing receptacle receiving region, and filter case structure for releasable engagement with that support structure. The filter case structure has an outlet in which an anti-drip valve is disposed. A valve operating mechanism includes biasing means for biasing the valve to its closed position, and one piece lever structure is connected between the biasing means and the valve for moving the valve to its open position. The one piece lever structure is deflectable about a first axis of rotation by a stop on the housing as the filter case structure is inserted into the beverage making machine without opening said anti-drip valve, and, insertion of the storing receptacle beneath said filter case structure moves the lever about a second axis of rotation to open the anti-drip valve.

19 Claims, 3 Drawing Sheets

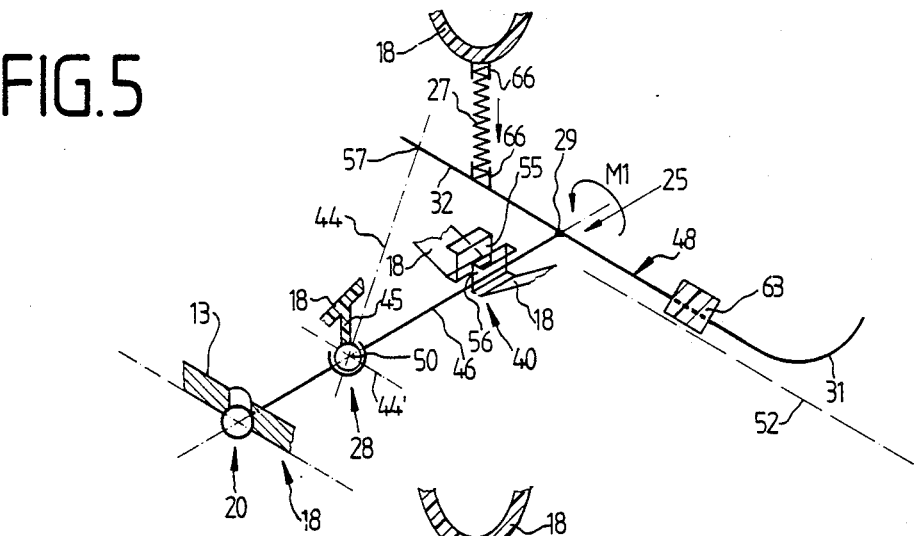
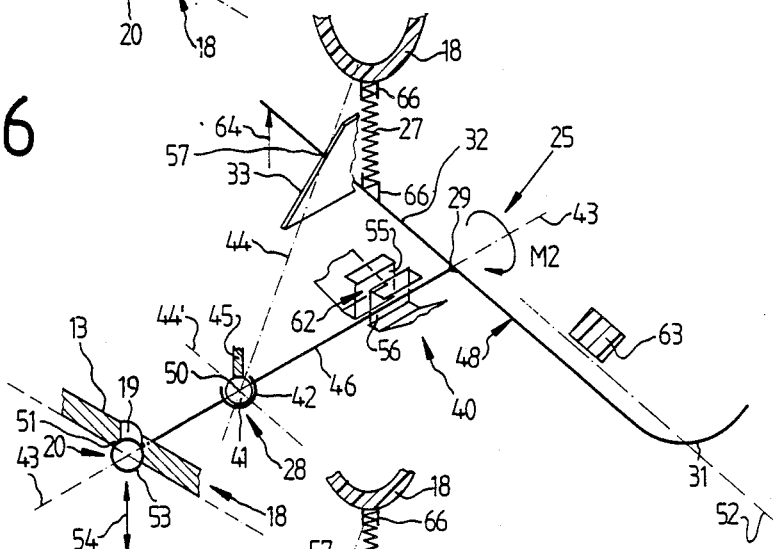
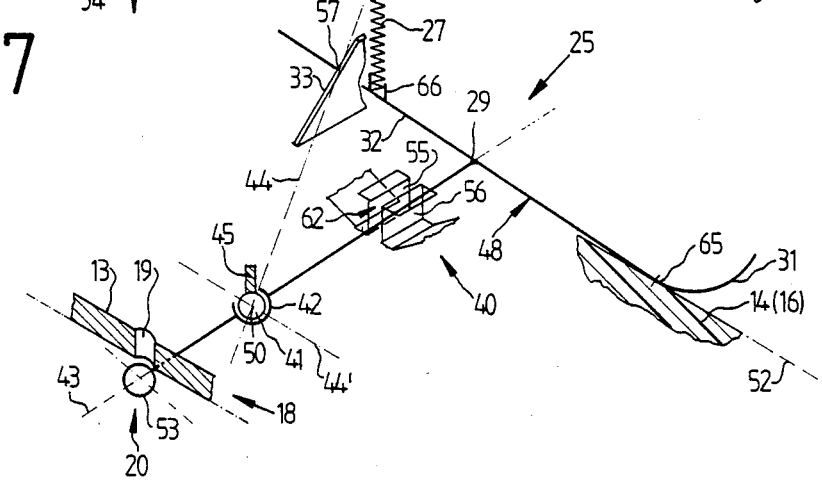

BEVERAGE-MAKING MACHINE

The present invention relates to a beverage-making machine, in particular for making filtered beverages such as coffee or tea, having a filter case mountable into a housing, on the bottom of which case an anti-drip valve is arranged which, via a point of support is coupled to a lever and which, via the latter, is movable into the closed position by means of a spring element, while upon mounting of the filter case into the beverage-making machine, for obtaining a ready position, a first portion of said lever is movable about a first axis of rotation by a stop on the housing in such a manner that, in doing so, without opening the anti-drip valve, a second portion of said lever moves into the range of effect of a storing receptacle and that, only by insertion of the storing receptacle beneath the filter case, the second portion of the lever is actuated by the storing receptacle to move about a second axis of rotation such that the anti-drip valve will then assume its opened position.

A like beverage-making machine is known already from DE-A1 34 16 403 which is equipped with a horizontally pivotable filter case and the anti-drip valve of which is applicable by a spring element in the closing direction and is movable into its opened position by means of a double lever assembly. This double lever assembly is composed of an activating lever and a keying lever which are arranged in such a manner that first the activating lever must have removed the keying lever from its inactive position to adopt its ready position that reaches the range of effect of the storing receptacle. Only thereafter, opening of the anti-drip valve becomes possible by further tilting the keying lever through the top side of the coffee jug. Admittedly, a like rod assembly for actuating the anti-drip valve operates very reliably, yet it is comparatively complicated and thus expensive.

In contrast thereto, the present invention has for its object to devise an adjusting mechanism for an anti-drip valve which will do with fewer mechanical component parts, yet which will function properly just the same and afford cost reduction also.

This object is achieved according to the instant invention in that the lever is of one-piece design and that the lever is successively turned about two axes of rotation for adopting its ready position and, subsequently, for attaining the opened position of the anti-drip valve. Compared to the state of the art, an additional lever is economized owing to this inventive arrangement so that the costs for the beverage-making machine are curtailed, whilst the sequence of function stays the same. The fact that the assembly is also facilitated due to this entails further cost reduction.

It is provided in a first embodiment of this invention that the two axes of rotation extend in parallel to one another and vertically relative to the longitudinal direction of the lever. Herein, the lever is in each case turned vertically relative to the substantially horizontal movement of the storing receptacle and the filter case in order to permit actuation of the lever by the filter case and/or the storing receptacle. Further, it is suggested by this invention that, in the ready position, the first direction of rotation is at the same time the point of support of the anti-drip valve, while this first direction of rotation has a play in relation to the anti-drip valve and/or the lever which is predetermined in the direction of rotation of the lever, and while for opening the anti-drip valve a second axis of rotation is constituted at the lever which, after the ready position of the filter case is reached, is formed by the abutment point resulting between the first lever portion and the stop on the housing. To the end that the anti-drip valve remains closed when the lever is deflected into its ready position, the first axis of rotation is simultaneously representing the point of support of the anti-drip valve. The fact that the lever is with its lever end abutting on the housing during the ready position allows the lever to now turn around the abutment point in opposition to its previous direction of rotation which had been necessary to attain the ready position. However, this is possible only if for opening the anti-drip valve the lever is provided with the play established in the actuating direction of the anti-drip valve, to the end that displacement of the lever relative to the filter case is possible during opening of the anti-drip valve.

To realize this bearing play, it is arranged for in an improvement of this invention that it is produced by at least one oblong aperture designed on the lever and a joint pin designed on the filter case and engaging into this oblong aperture. Yet it is also possible that the play is produced by at least one oblong aperture designed on the filter case and a joint pin that is designed on the lever or on the anti-drip valve and that engages into the oblong aperture. Any one of these embodiments can be chosen at will. They permit being shaped particularly easily on the filter funnel above all in the even that the individual component parts are made of plastics.

In order to achieve opening of the anti-drip valve by way of the upper edge of the storing receptacle and/or the cover, preferably, the shift of the first axis onto the second axis is performed by the second lever position which is moving into engagement with the storing receptacle and which is designed between the first axis of rotation and the second axis of rotation on the lever. In a particularly simple fashion, this second portion permits to be shaped as a support on the lever's bottom side facing the storing receptacle.

To ensure that the lever is always swivelled back into its initial position when it is not actuated, for instance when the filter case 18 is pivoted outwards or removed from the beverage-making machine 10, and to ensure that simultaneously the first axis abuts on that end of the oblong aperture that is closer to the anti-drip valve in order to accomplish that the lever approaches the filter case when the anti-drip valve opens, favourably, the spring element takes support on the filter case and on the lever. In order to achieve resetting of the lever by way of the spring element in a particularly easy fashion, the said element is formed by a compression spring which makes catch at the lever behind the first axis of rotation, when viewed in the longitudinal direction from the second to the first axis of rotation on the lever.

To safeguard that in the event of corresponding movements of the lever the anti-drip valve will open only if the lever is turned counterclockwise, it is arranged for according to an improvement upon this invention that the valve seat formed by the anti-drip valve is placed inside the filter case at the outlet opening and that a valve mechanism connecting the anti-drip valve penetrates the outlet opening outwardly to the lever.

According to a second embodiment of this invention, the first axis of rotation extends in the longitudinal direction of the lever, the anti-drip valve and the point of support being pivoted, and the second axis extending through the point of abutment formed by the first portion and by the stop on the housing and through the centre of the point of support. In this second embodiment, too, the one-part lever according to this invention must be turned around two axes until it is able to open the valve. In this arrangement, the anti-drip valve, the bearing of the lever and the first lever portion lie on one common first axis of rotation so that—as long as the lever is turned about this axis of rotation—the anti-drip valve will not be opened. However, in order to cause the anti-drip valve to move from its ready position to its opened position upon a second rotation of the lever which counteracts the latter's first rotation, a second axis of rotation must be formed on the lever according to this invention. On account of the second axis of rotation which is herein disposed outside of the lever, the valve member is moved away laterally downwardly from the sealing surface during opening. This could have adverse effects on the valve's useful life. To safeguard that the valve member will always lift concentrically from the sealing surface, it is suggested by another improvement upon this invention that the first axis of rotation extends in the longitudinal direction of the lever, that the anti-drip valve and the point of support are pivoted and that the second axis of rotation is formed by the point of support which extends substantially vertically relative to the first lever portion. As a result, the lever is given a guidance which forces it during the opening of the anti-drip valve to rotate about the point of support in such a manner that, in doing so, the valve member will lift concentrically from the valve seat in downward direction.

In order to allow the lever to rotate about itself, the anti-drip valve is formed by a spherical valve and the point of support is formed by a ball-and-socket joint, the point of support and the anti-drip valve being arranged one behind the other when viewed in the longitudinal direction of the lever.

In order to admit beside the rotation of the lever about its own axis still a movement vertically relative to the sealing seat of the outlet opening designed on the bottom portion of the filter case, it is proposed in an improvement of the instant invention that the lever is guided by a guidance in the opening and/or closing direction of the anti-drip valve. Namely, if this guiding arrangement did not exist, proper opening of the anti-drip valve would be hardly practicable, since the lever would tilt away sideways when pivoted by the storing receptacle and would not move in one single plane only.

Advantageously, the said guidance is established by two opposed walls which are placed on the filter case and extend in the opening and/or closing direction of the anti-drip valve, between which walls a part of the lever is slidably supported with little play. This safeguards a lateral guidance of the lever so that a rotation of the first lever portion about its longitudinal axis is enabled for the purpose of the ready position and, for the purpose of the opened position, a rotation vertically to the longitudinal axis of the first lever portion about the fulcrum of its point of support like a two-armed lever. The walls permit to be shaped particularly easily on a filter case made of plastics if they are disposed on the filter case in a projecting manner.

In order to ensure that the second portion of the lever which extends transversely to the first lever portion will always be outside of the range of effect of the storing receptacle in the event that the filter case is not properly set into the beverage-making machine, the spring element will preferably act such upon the lever that, in doing so, rotation of the lever will cause the second portion to automatically approach the filter case. A particularly simple solution will result when the spring element is designed as a compression spring and when the latter's force will act upon the first portion of the lever in the opening direction of the anti-drip valve. However, it is also possible to design the spring element as a tension spring which, in turn, is required to act upon the second portion of the lever in such a manner that this second portion of the lever will always persist resiliently outside of the range of effect of the storing receptacle in the closed position of the anti-drip valve. In order to achieve this effect, other spring elements such as a leaf spring or otherwise shaped springs can be used as well which, of course, will then have to engage on the lever corresponding to their effect in order to bring about a rotation of the lever to the left (that means counterclockwise).

Figure 2:
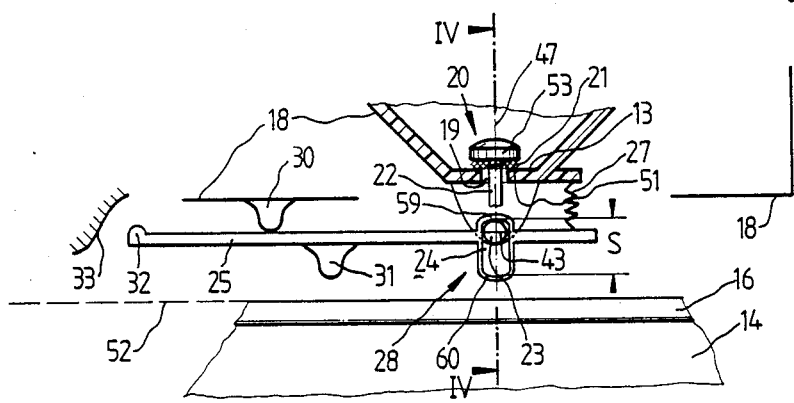
Figure 3:
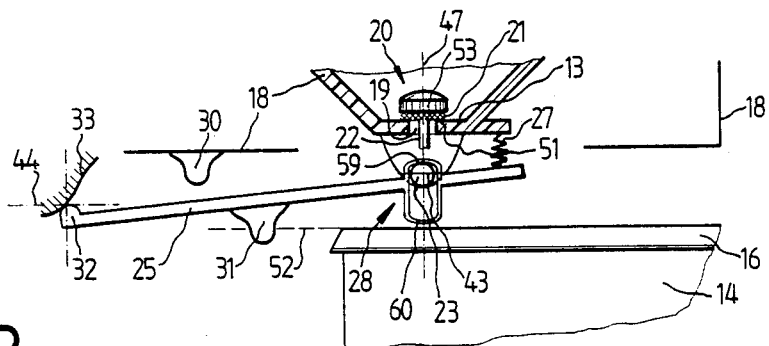
Figure 4:
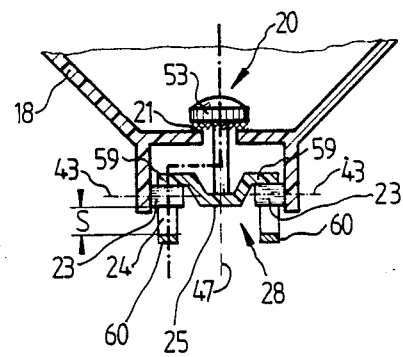

Two embodiments of this invention are illustrated in the accompanying drawings and will be explained in more detail hereinbelow. In the drawings, FIG. 1 is a partial view of a coffee maker or tea maker having a filter case with its bottom area in partial cross-section, having an anti-drip valve adopting its opened position and showing a first embodiment, and having a storing receptacle, shown in partial cross-section, that is placed beneath the anti-drip valve, FIG. 2 shows the closed position of the anti-drip valve illustrated in FIG. 1, FIG. 3 shows the ready position of the anti-drip valve displayed in FIGS. 1 and 2, FIG. 4 is a partial longitudinal cross-section taken along the intersection line IV—IV of FIG. 2, FIG. 5 shows the closed position of an anti-drip valve according to a second embodiment of this invention illustrated in a schematic and perspective view, FIG. 6 is the ready position of the anti-drip valve of the second embodiment according to FIG. 5, and FIG. 7 shows the opened position of the anti-drip valve of the second embodiment according to FIGS. 5 and 6.

To avoid repetitions, like reference numerals have been used for identical parts in FIGS. 1 to 7. This facilitates also to compare structurally identical component parts in the various embodiments.

FIG. 1 displays a beverage-making machine 10 designed as coffee maker and/or tea maker which is substantially composed of a filter case 18 that is supported on a housing 11 horizontally pivotable in the direction of the arrow X and of a storing receptacle 14 that is insertable beneath the filter case 18 and is configured as a coffee jug and/or tea pot. The substantially hollow-cylindrical storing receptacle 14 is seated on a preferably heatable plate 15 and its receptacle opening 58 is closed by a substantially circular-disc-shaped removable cover 16 which contains an inlet opening 17 in its middle. The filter case 18 serves to receive a filter (not shown in the filter case 18) which can be filled with coffee powder and/or tea leaves on which hot water is poured for extraction. The water filled into a water tank 9 is heated in a continuous flow heater attached beneath the plate 15, yet not illustrated in the drawing, and is supplied from there into the filter case 18 via a water pipe, not shown in the drawing. Said filter case 18 can be used both for brewing coffee and tea. However, it is also possible to use a separate filter case 18 for coffee and tea in order to avoid adulterations in taste.

The bottom 13 of the filter case 18 contains an outlet opening 19 which, in the swung-in condition of the filter case 18, is aligned substantially coaxially to the inlet opening 17 of the storing receptacle 14. The outlet opening 19 can be closed by an anti-drip valve 20 which is composed of a mushroom-like valve member 53 designed in the interior of the filter case 18 and having a valve mechanism 22 as well as a valve seal 21 attached to the valve mechanism and facing the outlet opening 19. When the anti-drip valve 20 is closed, the valve member 53 urges the valve seal 21 pressure-tightly against the valve seat 51 encompassing the outlet opening 19. According to FIGS. 1 to 4, the valve mechanism 22 penetrates the outlet bore 19 of the filter case 18 from the top to the bottom. The end of the valve mechanism 22 extending beneath the outlet opening is rigidly coupled to the lever 25. The valve seal 21 must be designed sufficiently elastically so that, when the lever 25 is swivelled to assume its ready position (FIG. 3), proper sealing of the anti-drip valve 20 is safeguarded nevertheless due to the slight inclination of the valve member 53. To this end, there must also be a sufficiently large play between the outlet opening 19 and the valve mechanism 22. Yet it is also possible to arrange the valve mechanism 22 on the lever 25 in an elastically deformable and/or an articulate fashion in order to prevent the valve mechanism 22 anyway from adopting an inclined position relative to the outlet opening 19 which would be caused by the rotating movement of the lever 25 into its ready position.

According to FIG. 4, the filter case 18 is furnished with two opposed joint pins 23 beneath the outlet opening 19 which extend substantially in parallel to the surface of the cover 16 and which engage from outwardly into each one oblong aperture 14 of the lever 25 extending substantially in parallel to the central axis 47 of the anti-drip valve 20. The upper and the lower wall 59, 60 of the oblong aperture 24 confine the stroke S of the valve member 53 in its opening and/or closing direction 54. The joint pins 23 form simultaneously the point of support 28 and the first axis of rotation 43 for the lever 25. The central axis 47 of the outlet opening 19 forms the axis of symmetry of the point of support 28.

As can be gathered from FIGS. 1 to 3, the lever 25 extends beyond the point of support 28 in the drawing to the right. On its top side 26, a spring element 27 designed as a compression spring is abutting which takes support with its upper end in the drawing on the bottom side of the filter case 18. Caused by the force of the compression spring 27, the lever 25 is turned clockwise and abuts on an abutment 30 in the closed position on the anti-drip valve (FIG. 2), the said abutment being shaped on the bottom side of the filter case 18 (FIGS. 1 to 3) on the left side of the point of support 28 and above the lever 25 on the filter case 18.

According to FIGS. 1 to 3, the bottom side of the lever 25 is furnished with a second portion 31 between the abutment 30 and the point of support 28, which portion is designed as a dog and against which the top side of the cover 16, i.e. the rim of the storing receptacle 14, is movable into abutment when the storing receptacle 14 is slid in (FIG. 1) after the filter case 18 has already adopted its ready position (FIG. 3). Disposed on the left-hand free end of the lever 25 is a first portion 32 which is designed as a dog, which is part of the housing 11 of the coffee maker 10 and which, according to FIG. 3, will move to bear against the stop 33 on the housing in the ready position of the filter case. The first portion 32 together with the stop 33 on the housing form the second axis of rotation 44 of the lever 25.

The mode of effect of the inventive coffee maker or tea maker according to the first embodiment is as follows:

In the closed position of the anti-drip valve 20 (FIG. 2), the spring element 27 presses the portion of the lever 25 that is disposed on the right of the point of support 28 downwardly in the drawing and thereby causes the anti-drip valve 20 and/or the valve member 53 to move into sealing abutment on the valve seat 51 of the outlet opening 19. In this arrangement, the upper wall 59 of the oblong apertures 24, when viewed in the drawing, takes support on the top side of the joint pins 23 and thus on the filter case 18 so that the lever 25 is hung stationarily on the filter case 18. Caused by this torque acting clockwise upon the lever 25, the said lever 25 will simultaneously abut on the abutment 30, in order to ensure a defined initial position of the lever 25 in relation to the stop 33 on the housing.

In the process of the filter case 18 swinging into its ready position (FIG. 3), the first portion 32 of the lever 25 moves against the stop 33 on the housing so that upon further pivoting of the filter case 18 the first portion 32 will be pressed downwardly in the drawing by the stop 33, whereby the lever 25 is turned about the joint pin 23 counterclockwise. However, opening of the anti-drip valve 20 does not take place, since due to the counterclockwise rotation of the lever 25 the second portion 31 will move into the range of effect 52 of the storing receptacle 14 and/or the range of effect of the cover 16 closing the storing receptacle 14. Although the lever 25 is turned about the joint pin 23 by a few degrees during this rotation, that means the valve member 53 will follow the lever 25 on account of it being rigidly coupled to the lever 25, the anti-drip valve 20 will remain closed nonetheless, since the particularly elastical valve seat 21 will compensate for these minor valve clearance variations. Displacement of the valve member 53 upwardly, when viewed in the drawing, will not take place either, since the said member is disposed on the first axis of rotation of the lever 25. Further, the upper wall 59 of the oblong apertures 24 takes support on the joint pins 23 in the ready position.

When now, according to FIG. 3, the storing receptacle 14 with its cover 16 is inserted into the space bounded in its height inbetween the heatable plate 15 and the filter case 18, the upwardly conical rim of the cover 16 will abut on the second portion 31 of the lever 25 and, upon continued insertion of the storing receptacle 14 beneath the filter case 18, will urge the lever 25 upwardly about the second axis of rotation 44 which is now newly formed for the lever and, in doing so, will turn the lever 25 counterclockwise. Since the joint pins 23 are rigidly coupled with the filter case 18—of course the filter case 18 is no more vertically adjustable in the longitudinal direction of the outlet opening 19 in the ready position—the oblong aperture 24 with the lever 25, the valve member 53 and the valve seal 21 will move upwardly in the drawing according to FIGS. 3 and 4 for as long as until the bottom wall 60 of the oblong aperture 24 abuts on the joint pin 23. Now the lever 25 has reached its final position and can no more be turned counterclockwise. The anti-drip valve has reached its maximum opened position.

The arrangement shows that only one single lever 25 according to the invention allows to open the anti-drip valve 20, provided that the filter case 18 and the storing receptacle 14 with its cover 16 are properly placed in the coffee maker 10.

When for removing the readily brewed beverage the storing receptacle 14 with the cover 16 is taken from the heatable plate 15, the sequences of motion of the lever and of the anti-drip valve will take place in reverse order, as described above, until the anti-drip valve 20 is closed and thus no drip may fall on the plate 15.

When, for instance, the filter case 18 is first swung outwards, while the storing receptacle 14 is still duly placed on the heatable plate 15, the first portion 32 will move upwardly alongside of the stop on the housing according to FIG. 3, and first the lever 25 will turn clockwise about the second portion 31. The lever 25 with the oblong aperture 24 will move downwardly for so long until the anti-drip valve 20 is closed. When the filter case 18 is swung out further, the first portion 32 continues to move upwards until the lever 25 abuts on the abutment 30. Shortly before, the second portion 31 has lifted already from the cover 16. In this second sequence of motion, the lever 25 turns again clockwise around the first axis of rotation 43.

The one-part lever 25 in conjunction with the anti-drip valve 20 bears the advantage that the dimensions of these parts in respect of the stop 33 on the housing and the second portion 31 allow to be sized such that the anti-drip valve 20 will abruptly open and/or close only shortly before and/or in the end position of the filter case 18 and of the lever 25. Furthermore, this inventive arrangement permits to compensate particularly straightforwardly for major variations in tolerances which may easily occur in the manufacture and the assembly of plastic parts, since the lever 25 represents a transmission mechanism.

In FIGS. 5 to 7, a second embodiment of this invention is schematically illustrated. Whilst the lever 25 is schematically illustrated in its entirety, only fragments of the filter case 18 are shown, and of the housing the stop 33 on the housing is shown only in FIG. 6, and of the coffee pot only the latter's upper range of effect 52 is depicted. In this embodiment, the lever 25 is composed of a first lever potion 46 succeeding which in the drawing from the left to the right, in adjacency to the anti-drip valve 20, are a point of support 28, a guidance 40 and a second lever portion 48 which extends transversely to the first lever portion 46.

According to FIGS. 5 to 7, the anti-drip valve 20 consists of a valve member 53 which is secured to the left-hand end of the first lever portion 46 and is designed as a ball, the said valve member being both in the closed position (FIG. 5) and in the ready position (FIG. 6) in sealing abutment on a valve seat 51 that bounds the outlet opening 19 of the filter case 18 downwardly and is conformed to the spherical surface of the valve member 53. Succeeding the anti-drip valve 20 at a predetermined distance on the right-hand side thereof on the first lever portion 46 is the point of support 28 which consists of a spherical recess 42 that is shaped at the first lever portion 46 and into which a ball 41 adapted to the recess 42 in inserted from above with a view to forming a ball-and-socket joint. The ball 41 is integrally coupled with the filter case 18 through an assembling pin 45. Thus, the lever 25 is pivoted in all directions due to this bearing on the ball 41.

According to FIGS. 5 to 7, adjoining the point of support 28 on the first lever portion 46 to the right is further a guidance 40 which is composed of two walls 55, 56 which are attached to the filter case 18 and extend in parallel to the opening and/or closing direction 54 of the anti-drip valve 20. The first lever portion 46 is slidably guided in the plane of the opening and/or closing direction 54 caused by the equally wide gap 62 formed by the two opposed walls 55, 56.

A second lever portion 48 extending transversely to the first lever portion 46 is designed on the end of the first lever portion 46 that projects to the right beyond the guidance 40 in FIGS. 5 to 7. Thus, the lever 25 constituted by the first and the second lever portion 46, 48 constitutes substantially a T.

The part of the second lever portion 48 that is disposed on the left of the junction 29 in FIGS. 5 to 7 forms corresponding to FIGS. 1 to 3 the first portion 32 of the lever 25, while the right-hand part of the second lever portion 48 forms the second portion 31 of the lever 25.

A spring element 27 designed as a compression spring takes support on the housing of the filter case 18 and presses from above on the first portion 32 of the lever 25. In consequence thereof, the lever 25 is applied with a torque M 1 directed to the left according to FIG. 5, the said torque causing the lever 25 to turn to the left for so long until it abuts with its second portion 31 on a stop 63 designed on the filter case 18 and until it hence automatically persists in its initial and/or closed position according to FIG. 5. The compression spring 27 is guided in a guidance 66 designed on the filter case 18 and on the first portion 32 and is preloaded in a predefined degree due to the predetermined distance between the two guidances 66. In the closed position of the anti-drip valve 20 illustrated in FIG. 5, either the filter case 18 is swung out of the beverage-making machine 10 and/or is dismounted from it, or it is not yet in its complete final position swung into the beverage-making machine 10.

The final position of the filter case 18 in the coffee maker is not shown until in FIG. 6 where there is arranged in the drawing a stop 33 that is designed on the housing 11 (not illustrated), that extends from the front transversely to the back in the direction of movement of the filter case 18 and serves as a mounting ramp, on which stop the first portion 32 will slide upwardly in the drawing according to the direction of the arrow 64 when the filter case 18 is pivoted inwards so that the lever 25 is applied with a torque M 2 turning it clockwise to the right. As a result, the second portion 31 will swivel downwards, when viewed in the drawing, and thus reaches the range of effect of the storing receptacle 14 and its cover 16. Upon rotation of the lever 25 to the right, the compression spring 27 is biassed still more.

When now the storing receptacle 14 with its cover 16 is slid beneath the filter case 18, the upper rim of this storing receptacle 14, i.e. its cover 16, will abut on the curved second portion 31 which performs the function of a ramp. Upon further displacement of the storing receptacle 14 with its cover 16 against the second portion 31, the latter is lifted upwardly in consequence of the ramp, as shown in the drawing, whereby the lever 25 is now subjected to a counterclockwise rotation which, however, is now not carried out around the first axis of rotation 43 extending in the longitudinal direction of the first lever portion 46, as described already in FIG. 5, but around a second axis of rotation 44. This second axis of rotation 44 in FIGS. 1 to 3 obligatorily ensues from that the lever 25, on the one hand, abuts with its first portion 32 stationarily on the stop 33 on the housing, one common point of abutment 57 being formed thereby, and from that the lever 25, on the other hand, continues to be coupled with the filter case 18 through the centre 50 of its point of support 28. That is to say, the lever 25 is now supported by way of three points, namely the point of support 28, the point of abutment 57 and the point of contact 65 formed by the storing receptacle 14 and/or its cover 16 and the second portion 31.

Yet it is the guidance 40 which serves to ensure that the valve member 53 of the anti-drip valve 20 will lift at all concentrically to the outlet opening 19 in downward direction according to FIG. 7 during the rotation of the lever 25 about its second axis of rotation 44. This is because if the guidance 40 did not exist, the lever 25 would turn off sideways around the second axis of rotation 44. However, owing to the guidance 40, the second axis of rotation 44 will shift to 44', and now the lever 25 turns about the centre 50 of the point of support 28 in the plane of the gap 62, that means in the opening direction 54 of the anti-drip valve 20. That means, the gap 62 formed by the opposing walls 55, 56 permits the first lever portion 46 only to rotate in that plane of rotation in which the plane of the outlet opening 19 is disposed. Hence, it is safeguarded thereby that the valve member 53 lifts downwardly in the longitudinal direction and centrically relative to the outlet opening 19. While the anti-drip valve 20 is opened due to the second portion 31 being lifted by the storing receptacle 14, according to FIG. 7, the first lever portion 46 is turned, on the one hand, in the longitudinal direction of the gap 62—because there the lever 25 cannot escape into any other plane than into that one of the gap 62—while, on the other hand, it is turned in its longitudinal direction around the point of support 28 in itself. However, only the distance covered in the gap 62 by the first lever portion 46 serves to open the valve. In the event of corresponding dimensioning of the individual lever lengthes on the lever 25 and of the course of the ramp from stop 33 and portion 31, the anti-drip valve 20 can be opened already upon slightest torsional movements and/or displacements of the filter case 18 and/or the coffee pot 14 away from their area of final position or towards there.

We claim:

1. A beverage making machine comprising a housing having structure defining a storing receptacle receiving region and support structure above said storing receptacle receiving region,
   filter case structure for releasable engagement with said support structure,
   said filter case structure having an outlet and an anti-drip valve disposed in said outlet, said anti-drip valve being movable between closed and opened positions,
   a valve operating mechanism including biasing means for biasing said valve to its closed position closing said filter case outlet, and one piece lever structure connected between said biasing means and said valve for moving said valve to its open position,
   said one piece lever structure being deflectable about a first axis of rotation to a ready position by a stop on the housing as said filter case structure is inserted into said beverage making machine without opening said anti-drip valve, and, only by insertion of said storing receptacle beneath the filter case structure, said lever is deflected by said storing receptacle to move about a second axis of rotation to open said anti-drip valve.

2. A beverage making machine as claimed in claim 1, wherein said two axes of rotation extend in parallel to each other and vertically in relation to the longitudinal direction of said lever.

3. A beverage-making machine as claimed in claim 2 wherein, in the ready position, said first axis of rotation is at the same time the point of support of said anti-drip valve (20), said first axis of rotation has a play (S) in relation to said lever which is predetermined in the direction of rotation of said lever, and, for opening said anti-drip valve, said second axis of rotation is formed on said lever which, after said ready position is reached, is constituted by a point of abutment between said lever and said stop on said housing.

4. A beverage-making machine as claimed in claim 3 wherein said play (S) existing on said point of support is produced by at least one oblong aperture designed on said lever and by a joint pin that is designed on said filter case and engages into said oblong aperture.

5. A beverage-making machine as claimed in claim 3 wherein said play (S) existing on said point of support is produced by at least one oblong aperture and by a joint pin that engages into said oblong aperture.

6. A beverage-making machine as claimed in claim 3 wherein said lever structure includes a portion between said first axis of rotation and said second axis of rotation which by engagement with said inserted storing receptacle, causes said lever to move about said second axis of rotation to open said anti-drip valve.

7. A beverage-making machine as claimed in claim 6 wherein said portion is an abutment which is arranged on the bottom side of said lever facing said storing receptacle.

8. A beverage-making machine as claimed in claim 1 wherein said biasing means includes a spring element that is supported on said filter case and on said lever.

9. A beverage-making machine as claimed in claim 8 wherein said spring element is a compression spring which engages said lever behind said first axis of rotation, when viewed in the longitudinal direction from said second to said first axis of rotation on the lever.

10. A beverage-making machine as claimed in claim 1 wherein a valve seat formed by said anti-drip valve and said outlet opening is inside said filter case, and in that a valve mechanism connecting said anti-drip valve penetrates said outlet opening outwardly to said lever.

11. A beverage-making machine as claimed in claim 1 wherein said first axis of rotation extends in the longitudinal direction of said lever, said anti-drip valve is pivoted about a point of support, and said second axis of rotation extends through a point of abutment formed by said lever and said stop on said housing as well as through the centre of said point of support.

12. A beverage-making machine as claimed in claim 11 wherein said anti-drip valve includes a ball valve and said point of support is formed by a ball-and-socket joint, and in that, when viewed in the longitudinal direction of said lever, said point of support and said anti-drip valve are arranged one behind the other.

13. A beverage-making machine as claimed in claim 1 wherein said first axis of rotation extends in the longitudinal direction of said lever, said anti-drip valve is pivoted about a point of support, and said second axis of rotation extends substantially vertically relative to the first lever portion through said point of support.

14. A beverage-making machine as claimed in claim 13 and further including guidance structure for guiding said lever in the opening and/or closing direction of said anti-drip valve.

15. A beverage-making machine as claimed in claim 14 wherein said guidance structure is constituted by two opposed walls which are arranged on said filter case, which extend in the opening and/or closing direction of said anti-drip valve and inbetween which a part of said lever is slidably supported with little play.

16. A beverage-making machine as claimed in claim 15 wherein said walls are shaped at said filter case in a projecting manner.

17. A beverage-making machine as claimed in claim 1 wherein said biasing means includes a spring element that acts upon said lever in such a manner that, in doing so, rotation of said lever will cause a portion of said lever to approach said filter case.

18. A beverage-making machine as claimed in claim 17 wherein said spring element is designed as a compression spring of the anti-drip valve.

19. A beverage-making machine as claimed in claim 17 wherein said spring element is designed as a tension spring.

* * * * *

UNITED STATES PATENT AND TRADEMARK OFFICE
CERTIFICATE OF CORRECTION

PATENT NO. : 4,893,552
DATED : January 16, 1990
INVENTOR(S) : Dieter Wunder, et al.

It is certified that error appears in the above-identified patent and that said Letters Patent is hereby corrected as shown below:

Col. 2, line 29, "even" should be --event--;
      line 34, "position" should be --portion--.

Col. 10, claim 8, line 42, delete "on the lever".

Col. 12, claim 18, line 8, delete "of the anti-drip valve".

Signed and Sealed this

Twelfth Day of February, 1991

Attest:

HARRY F. MANBECK, JR.

*Attesting Officer*         Commissioner of Patents and Trademarks